United States Patent [19]
Alkemade

[11] 3,921,548
[45] Nov. 25, 1975

[54] PLANTING MACHINE FOR PLANTING POTTED PLANTS, BULBS, TUBERS AND THE LIKE

[76] Inventor: Antonius Johannus Cornelus Alkemade, Herenweg, Noordwijk, Netherlands

[22] Filed: May 17, 1974

[21] Appl. No.: 470,944

[30] Foreign Application Priority Data
May 22, 1973 Netherlands.................... 7307106

[52] U.S. Cl. .................................................. 111/2
[51] Int. Cl.² ......................................... A01C 11/00
[58] Field of Search .................................. 111/2, 3

[56] References Cited
UNITED STATES PATENTS

| | | |
|---|---|---|
| 2,959,141 | 11/1960 | Wilson ........................ 111/2 |
| 3,002,473 | 10/1961 | Morine ....................... 111/2 |
| 3,078,816 | 2/1963 | Poll............................ 111/2 |
| 3,246,615 | 4/1966 | Poll............................ 111/2 |
| 3,374,752 | 3/1968 | Shirozu..................... 111/2 |

*Primary Examiner*—Stephen C. Pellegrino

[57] ABSTRACT

A machine for planting potted plants, bulbs and the like, including means for moving the machine along the ground, arms mounted for rotation in at least one vertical plane in the direction of movement of the machine, each arm being provided with an element having the shape of a tray and being shaped for digging a furrow into the ground and for receiving and carrying a pot or the like, said tray being open at its back end, a prong being provided for pushing the pot out of said tray into the furrow just dug by it.

16 Claims, 7 Drawing Figures

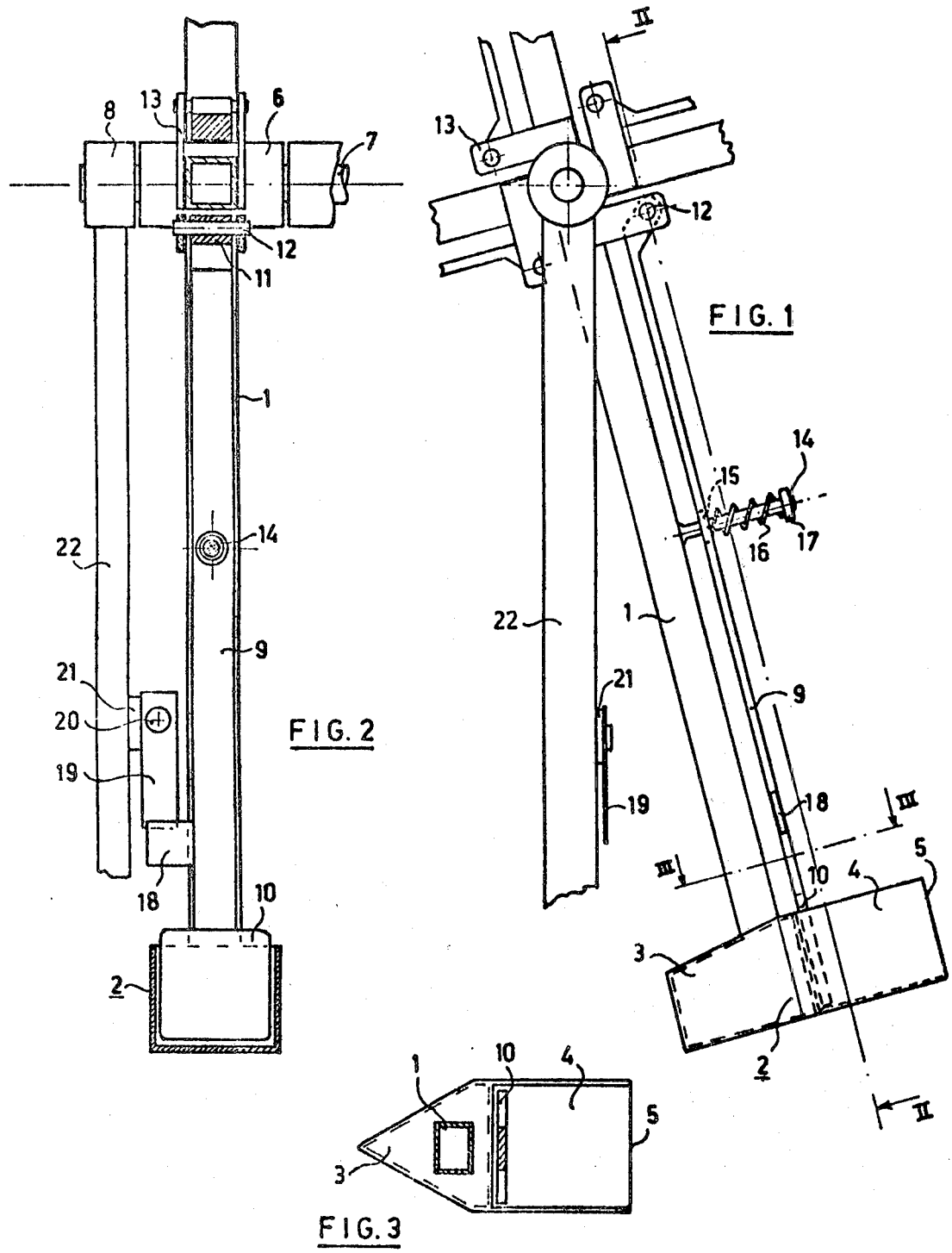

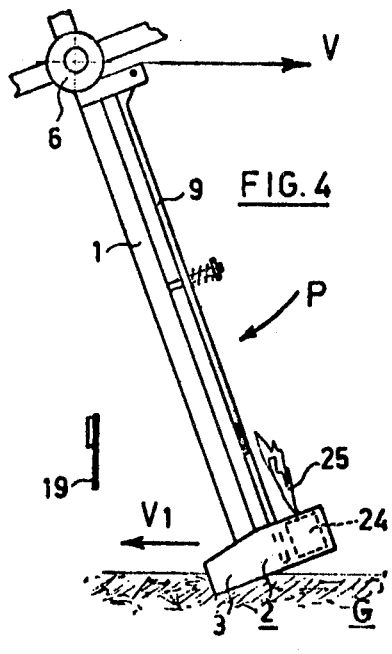
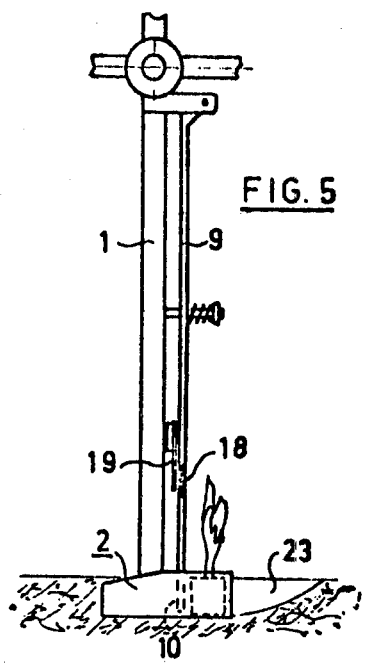
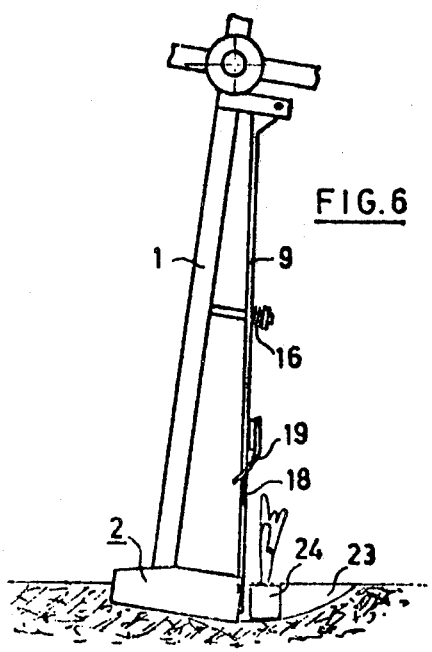
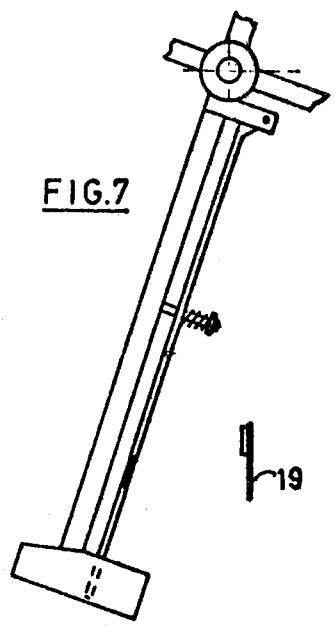

PLANTING MACHINE FOR PLANTING POTTED PLANTS, BULBS, TUBERS AND THE LIKE

The invention relates to a planting machine, for planting potted plants, bulbs, tubers and plants having root systems and so on, hereinafter collectively referred to as "plants" said machine being provided with a member for digging a furrow in the ground and with means for successively depositing the plants pots in the dug furrow at a predetermined distance from each other.

With a known machine of this type, the step of feeding the plants to the furrow takes place by means of a conveyor belt which, seen in the direction of displacement of the device, runs slopingly forward and downward and is provided with upstanding supports on which the plants are placed. The lower end of the belt is positioned closely above the bottom of the furrow, which is dug in the ground by means of said member, which is also connected with the machine.

In the process of digging the furrow, the removed soil will be thrown up on both sides of the furrow and, of course, it is desirable that the conveyor belt should not contact the soil that is thrown. As from a constructional point of view, the width of the belt can hardly be less than about 8 cm, so that the width of the furrow nearly always will be greater than that of the product to be placed in the ground. Since, furthermore, a furrow has to be dug along the complete length of the piece of ground which has to be planted, much more soil has to be removed than theoretically is necessary, and in completing the planting operation the greater part of the removed soil has to be brought back into its place again.

When the machine is used for placing so-called "pressed pots," "paperpots," and so on into the ground, it is desirable that the bottom of said pots should be flat, since otherwise it can easily happen that the pot will lean backward after having fallen from the conveyor belt into the furrow.

When reference is made to "presspots" and so on, the pots are pressed or moulded of a material, such as e.g., peat-dust or paper fibres, which after some time will form one entirety with the ground in which it is placed. As is known such a material is rather brittle, and damage can easily occur, in particular at the bottom of the pot, unless it is delicately handled.

When planting other products it also can easily happen that these will not be delivered into the furrow in exactly the right position, as they are more or less "free falling," before they reach the bottom of the furrow.

The invention now removes all these disadvantages by providing a machine, which is characterized in that it comprises at least one arm, which is mounted for rotation in a generally vertical plane by means of a shaft, running transversely to the direction of movement of the machine and parallel with the ground, said arm at its free end being provided with a digging member for locally digging a furrow in the ground, said member having substantially the shape of a tray on which also a pot can be placed, which pot is intended to be planted, said tray being open at its back end as viewed in the direction of rotation, means movable above the surface of the tray being present to push the pot or the like out of the tray into the freshly dug furrow, when the arm is at or near its lowermost position.

The width of the tray can be adapted to the width of the product to be planted, so that the dug furrow will auto-matically have the correct width. This provides considerable advantages, particularly when planting "presspots" and the like into the ground. Because the walls of the furrow tend to move a bit toward each other immediately behind the tray, a pot, which is shifted into the correct vertical position out of the tray, will at once rather rigidly be held in the furrow.

Furthermore it is clear that the quantity of soil to be displaced has become considerably smaller in accordance with this invention. In the first place this is due to the much smaller width of the furrow, but in the second place it also occurs because no continuous furrow is dug, but instead only a small furrow of limited length and individually provided for each plant. Such a furrow has, from a side-view, the shape of a segment of a circle, at least approximately.

Because of the much smaller width of the furrow, the so-called "earthing up" of the pots and of other products be also better and easier, because less soil needs to be displaced.

Furthermore, the correct shape of the furrow can easily be provided and maintained, since sticking of soil to the walls of the tray can be counteracted by urging the walls, e.g., during their rotation, to brush past rubber flaps.

According to a preferred embodiment of the invention, the direction of rotation and the angular velocity of the arm are such that the arm in about its lowermost position, moves contrary to the direction of displacement of the shaft, and thus of the machine, and at that point will have a movement with respect to the ground which is opposite to the direction of movement of the machine.

By such an embodiment, the movement of the arms to a certain extent contributes to the displacement of the complete machine, by which the power consumption can be reduced.

The means for pushing the object present in the tray out of said tray preferably consists of a prong extending approximately along the arm and hingedly connected to the arm at a point above the tray. This prong at about its lowermost position, is stopped by an abutment which is fixedly connected to the frame of the machine.

By this means the movement of the flexible prong relative to the tray always takes place at the same position of the arm relative to the ground, by which the mutual distances between the deposited pots or the like will hardly differ.

The preferred embodiment includes a means which limits the stroke of the prong relative to the arm, while the abutment which is fixedly connected to the frame of the machine, or that part of the prong contacting it, is resiliently executed to allow the passage of the flexible prong after carrying out its stroke.

In this way a simple and reliable construction can be obtained.

Although the flexible prong during the rotation of its arm, will again move toward this arm under the influence of its weight, it will in many cases be preferred to provide a spring between the flexible prong and the arm, said spring urging the strip toward the arm or pulling the prong toward the arm. When a compression spring is used, said spring can be arranged and positioned such that it limits the stroke of the flexible prong relative to the arm at the same time. This is because e.g., the windings of the compression spring are lying against each other when the angle between the arm and the prong is maximal.

It will be clear that various arms can be mounted in one common plane on one shaft, so that the distance between the pots which are successively placed into the ground can be small, whereas still the angular velocity of the arms remains within predetermined limits. Providing various arms in one plane is also preferred, or course, in view of eccentric forces.

As is usual with known machines, the present machine can also be made suitable for planting several rows of pots at the same time, by providing several pairs of arms spaced on the shaft. The distance between the rows can then be varied by changing the distance between the pairs of arms. The location of the abutments, which are secured to the frame of the machine, has also to be adapted. This, however, will be no problem at all.

The invention is now further elucidated by means of the following specification in conjunction with the accompanying drawings, wherein:

FIG. 1 shows a schematic side elevation of a machine according to this invention;

FIG. 2 shows a view and a partial section along line II-II of FIG. 1;

FIG. 3 shows a section along the line III—III of FIG. 1; and

FIGS. 4–7 show the machine according to FIGS. 1–3, on a reduced scale, and in certain positions during operation.

As appears from FIGS. 1–3, a machine according to the present invention in principle comprises an arm 1, which at one end is connected to an element which generally is indicated by 2. The element 2 serves for providing a furrow in the ground and for this purpose comprises a tapered portion 3, the element 2 at the same time serving for picking up the object to be placed into the ground, for which purpose it comprises a traylike part 4, one wall of which is omitted, so that a rearward opening 5 originates, through which an object, present in the tray, can be pushed out of the tray.

As appears from the drawing the tapered portion 3 of element 2 is completely closed and arm 1 is connected to the upper surface of it, such as e.g., by means of welding. Arm 1 is shown as a square tube, but of course can be shaped in any other suitable way. The other end of arm 1 is connected to a bush 6 mounted on a shaft 7, which is pivotably included in a supporting construction 8, forming part of the frame of the machine. In particular in FIG. 1 it is shown that bush 6 is connected to four arms 1, but this number can be varied within certain limits. Furthermore various bushes 6 can be provided on a common shaft 7, so that the machine is suitable for placing several rows of objects at the same time into the ground. Therewith the mutual distance between the bushes 6 can be varied and shaft 7 will be driven from a predetermined location. All this, however, will be clear to an expert and has not been shown in the drawing.

To be able to remove a product present in the tray 4 out of said tray, the machine comprises a flexible prong 9, the lower end 10 of which being broadened, so that this nearly fills the complete cross-section of tray 4.

At its upper end strip 9 is connected to a bush 11, which is rotatable about a shaft 12, which by ears 13 is connected to arm 1. For keeping the flexible prong 9 pressed against the inner forward wall of the tray 4, a pin 14 is secured to arm 1, said pin passing through a bore 15 into the prong 9. Around the pin 14 a compression spring 16 is present, one end of which is bearing against the prong 9 and on the other end against an end abutment 17, connected to pin 14. To this end the pin 14 can be provided with screw thread and abutment 17 then can be nut-shaped.

The prong 9 is furthermore provided with an abutment lip 18, which can co-operate with a plate spring 19, which by means of a bolt 20 is secured to a fixed part 21 of the frame of the machine. Frame part 21 can e.g., be connected to the frame portion 22, which again is connected to the support 8 for shaft 7. This construction can, however, also be executed in a completely different way, as it is only necessary that the plate spring 19 is fixedly connected to the frame of the machine. When, as explained above, bushes 6 are displaceable on shaft 7, for adjusting the distance between the rows, it is of course necessary that the plate springs 19 are adjustable too. This can e.g., be obtained by shiftable mounting parts 22 on a rail, which, outside the plane of movement of the arms, runs parallel with the shaft 7 and is connected to the frame of the machine.

It is clear that the plate spring 19 can also be replaced by a hinge abutment, which is under the influence of a spring, but all these details do not influence the working of the machine at all.

The working of the machine will now be described further, in particular with reference to FIGS. 4–7.

In FIG. 4, the direction of displacement of the machine is indicated by arrow V. Moving the machine can e.g., take place by means of a farm tractor, but the device can of course also be provided with its own driving means.

Shaft 7 is coupled with the moving means or with one or more of the support wheels of the machine, so that shaft 7 will rotate in the direction of arrow P, the coupling being such, that the element 2, at the end of arm 1 carries out a movement which is directed toward the left relative to the ground G and as seen in FIGS. 4–7, which movement is indicated by V1 in FIG. 4. By this the element 2 digs, by means of the point-shaped part 3 a furrow 23 into the ground, as in particular is shown in FIGS. 5 and 6. Because during the rotational movements of element 2 the shaft 7 is displaced, furrow 23 in side-view does not exactly obtain the shape of a segment of a circle.

During the downgoing movement of arm 1 a pot 24 is placed in the tray 4 of element 2, in which pot the plant 25 is present. In tray 4 also a bulb, a tuber or a bulbous or tuberous plant or the like can be placed.

When arm 1 has reached the position shown in FIG. 5, abutment lip 18 of the prong 9 engages the plate spring 19, which, as has already been said, is fixedly connected to the frame of the machine. By this prong 9 will going to rotate around its shaft 12 and move away from arm 1, such that the broadened end 10 of prong 9 pushes pot 24 out of tray 4 into furrow 23. The end position of the prong 9 relative to the arm 1 is shown in FIG. 6.

During the rotation of prong 9 spring 16 is compressed and when the lowermost portion 10 of prong 9 has reached the end of tray 4, as shown in FIG. 6, the windings of spring 16 will be pressed against each other, so that more or less a fixed connection is obtained between arm 1 and prong 9. By this the elasticity of plate spring 19 is removed and abutment lip 18 will pass spring 19. By spring 16 the prong 9 then will again move back to its original position, as shown in FIG. 7.

Further it can be remarked, that, as appears from FIGS. 5 and 6 the abutment lip 18, as long as this is retained by spring 19, shifts downward along said spring, as the center of rotation of the prong 9 relative to the centerline of shaft 7 is lowered, when arm 1 rotates from the position of FIG. 5 to that of FIG. 6. So, in the position of FIG. 6, the upper rim of abutment lip 18 is close to the lower rim of plate spring 19, so that plate spring 19 will easily allow the passage of abutment lip 18. The force with which spring 19 retains abutment lip 18 thus is great in the position of FIG. 5, so that pot 24 will easily be removed out of the tray 4, as for this the largest force is required.

Feeding of the pots or the other objects to the trays can be done in any known way, and means for doing this are not shown in the drawing.

The elements 2 preferably will be provided detachably and adjustably to arms 1. By this means the depth of planting can be changed, although this can also take place by making the frame of the machine, in which shaft 7 rotates and to which plate springs 19 are attached, completely adjustable in height relative to the wheel system supporting the device. The detachable relationship, however, gives great advantage in that the device can be made suitable for widely varying products. When planting leek e.g., a rather deep furrow is necessary, which, however, can be much narrower. Part 2 will then consequently have a greater height and the cutting portion 3 thereof can taper much more, so that a stronger "cutting" activity can be exerted. The stroke of the prong 9 therewith can become smaller, this can be obtained by screwing nut 17 farther on pin 14. When, on the contrary, it is desired to increase the length of tray 4, nut 17 can be screwed outwards on pin 14, to adapt the stroke of prong 9. The length of pin 14 will consequently be chosen such, that all possibilities are present, and nut 17 of course in some way will be fixed in the desired position e.g., by means of a split pin against undesired rotation during operation of the machine.

It will be clear that the embodiment described and shown in the drawing only serves for elucidating the principle of the invention and that many changes can be made, without falling outside the inventive idea. So can it e.g., be desired to see to it that the distance as from the center line of shaft 7 to the back rim of tray 4 is not greater than that as from the center line to the foremost, lowermost point of part 3. Also can e.g., between arm 1 and prong 9 a further fixed abutment be provided. When furthermore, as already indicated before, various bushes 6 are provided on a common shaft 7, with thereon various arms 1, the arms of successive bushes can be staggered, so that the machine can be used for planting the pots of several rows in staggered position. When operating in this way the driving of the machine requires less power, because a smaller number of furrows will be dug at the same time.

All these possibilities and changes, as referred to in the preceding paragraph will, however, be obvious to an expert.

I claim:

1. A machine for introducing a plant into the ground including: means for moving the machine along the ground; at least one arm mounted for rotation in a generally vertical plane by means of a shaft running transversely to the direction of movement of the machine and parallel with the ground, said arm at its free end being provided with a digging element for locally digging a furrow in the ground and having substantially the shape of a tray on which the plant which is to be planted can be carried, said tray being open at its back end as viewed in the direction of said rotation; and means carried by said arm and movable above the surface of said tray for pushing the plant out of said tray and into the furrow freshly dug by said tray when said arm is at or near its lowermost position.

2. A machine as defined in claim 1, including means for moving said arm in a direction to drive said tray into the ground in a direction opposite to the direction of movement of the machine.

3. A machine as defined in claim 2, wherein the means for pushing the plant out of said tray consists of a prong extending approximately along said arm and hingedly connected to said arm at a certain distance above said tray, and wherein an abutment is fixedly connected to the frame of the machine and arranged to stop said prong when said arm is at approximately its lowermost position.

4. A machine as defined in claim 3, the abutment for said prong or that part of said prong contacting said abutment being resiliently held to allow the passage of said prong after carrying out its stroke, means being present to limit this stroke and to bring the prong along said abutment.

5. A machine as defined in claim 4, said means for limiting the stroke of said prong being formed by a spring, biasing said prong to its normal position.

6. A machine as defined in claim 5, the force of said spring being adjustable for adjusting the stroke of said prong.

7. A machine as defined in claim 6, said pring being a compression spring, the windings of which lie against each other when the angle between said arm and said prong is maximal.

8. A machine as defined in claim 4, the resiliently executed abutment having the shape of a plate spring arranged along the longitudinal direction of said arm and said flexible prong, the center of rotation of said prong relative to said arm being situated such that the two points of abutment, after having contacted each other, shift along each other when said arm is rotated further, so that the force exerted on the plate spring shifts toward the free end thereof.

9. A machine for planting potted plants, bulbs, tubers and the like, including means for moving the machine along the ground in the direction of the pot row to be planted; a plurality of arms rigidly secured to an element which is rotatably mounted in the machine for rotation of said arms in a generally vertical plane parallel with the direction of movement of said machine, each of said arms at its free end being provided with an element for locally digging a furrow in the ground, in view of the fact that the direction of rotation and the angular velocity of said arm are such that the arm in about its lowermost position moves contrary to the direction of displacement of the machine and at that point will have a velocity with respect to the ground which is oppositely directed to the velocity of the machine, said element mainly having the shape of a tray in which a pot or the like can be placed which has to be planted, said tray being open at its back end seen in the direction of rotation, a prong being present in said tray for pushing the pot or the like out of the tray in the furrow dug by said tray when said arm is in or near its lowermost position, said prong running about along said arm and being hingedly connected to said arm at a certain distance above said tray and in the lowermost position of said arm being stopped by an abutment which is connected to the frame of the machine.

10. A machine as defined in claim 9, said element to which a plurality of arms is secured being formed by a bush, several bushes with arms being provided shiftably and fixably on a common shaft which is rotatably supported by the frame of the machine.

11. A machine as defined in claim 10, the arms of successive bushes being staggered relative to each other for planting pots and the like of several rows in staggered position.

12. A machine as defined in claim 10, said abutment for moving said prong for pushing the pot or the like out of the tray into the dug furrow is connected to a sleeve which is shiftably and fixably mounted on a rail, so that the abutment is adjustable together with the bush belonging to it.

13. A machine as defined in claim 12, said abutment or that part of the prong contacting it being resiliently executed and having the shape of a plate spring running in the longitudinal direction of said arm and said prong, the center of rotation of said prong relative to said arm being situated such, that the point in which the prong and the abutment contact each other will be displaced when said arm is rotated further, so that the force exerted on the plate spring shifts toward the free end thereof.

14. A machine for planting potted plants, bulbs, tubers and the like, including means for moving the machine along the ground; at least one arm mounted for rotation in a generally vertical plane running parallel with the direction of movement of the machine, said arm at its free end being provided with an element for locally digging a furrow in the ground, said element being detachably and fixably connected to said arm for adjusting the machine to various objects to be planted and having substantially the shape of a tray in which a pot or the like can be placed, said tray being open at its back end as seen in the direction of rotation; means in said tray at its forward end and carried by said arm for pushing the pot or the like out of said tray into the furrow dug by said tray when said arm is at or near its lowermost position.

15. A machine as defined in claim 14, wherein the means for pushing the object out of said tray comprises a prong extending into said tray and approximately along said arm, and hingedly connected to said arm at a location above said tray, the length of said prong being adjustable for adjusting the machine to various objects to be planted, said prong when in approximately its lowermost position being stopped by an abutment which is connected to the frame of the machine.

16. A machine as defined in claim 15, said abutment being adjustably connected to the frame of the machine.

* * * * *